United States Patent [19]

DiCecio

[11] 4,115,756
[45] Sep. 19, 1978

[54] WHEEL AND BRAKE ADVISORY SYSTEM FOR AIRCRAFT

[75] Inventor: Salvatore A. DiCecio, Irving, Tex.

[73] Assignee: Avmar, Incorporated, Ronkonkoma, N.Y.

[21] Appl. No.: 726,958

[22] Filed: Sep. 27, 1976

[51] Int. Cl.² .................. B08B 21/00; B60T 17/22
[52] U.S. Cl. .................... 340/27 R; 303/92; 303/96; 328/132; 340/52 B
[58] Field of Search ........... 340/27 R, 27 AT, 52 B; 303/92, 94, 96; 73/178 R, 178 T; 235/150.22; 324/161, 162, 166; 364/426; 328/132

[56] References Cited

U.S. PATENT DOCUMENTS

| | | | |
|---|---|---|---|
| 3,608,979 | 9/1971 | Coyle | 340/52 B |
| 3,822,921 | 7/1974 | Jones | 303/92 |
| 3,944,288 | 3/1976 | Bertolasi | 303/92 |
| 3,951,467 | 4/1976 | Fleagle | 303/92 |
| 4,005,910 | 2/1977 | Leiber | 303/96 |

*Primary Examiner*—Donald J. Yusko
*Assistant Examiner*—James J. Groody
*Attorney, Agent, or Firm*—Peter J. Murphy

[57] ABSTRACT

A wheel speed transducer, for each braked wheel of an aircraft, produces a DC voltage signal which is proportional to the wheel rpm. In one aspect, the system compares the wheel speed voltage signal with a fixed threshold voltage signal proportional to a selected wheel rpm which is indicative of a selected threshold ground speed such as 15 knots. When the threshold ground speed is reached, the system indicator advises that each wheel is or is not rolling at that speed. Another aspect of this system functions immediately after lift-off. The wheel speed voltage signal is compared with a modified wheel speed reference signal, which is maintained at a slightly lower voltage level for normal deceleration and which has a limited maximum rate of decrease determined electronically. Immediately after lift-off if a wheel deceleration rate is abnormally fast, the decreasing wheel speed signal will go negative relative to the decreasing reference signal, thereby producing a triggering signal to energize the system indicator device in the control cabin. An independent control circuit is provided for each of the braked wheels.

10 Claims, 2 Drawing Figures

WHEEL AND BRAKE ADVISORY SYSTEM FOR AIRCRAFT

BACKGROUND AND SUMMARY OF THE INVENTION

This invention relates to a system, for installation on board an aircraft, for detecting either a locked wheel or a binding wheel, and for advising the operators of the aircraft of these conditions. The system is effective during taxi-out and during the take-off roll to detect a locked wheel; and is effective immediately after lift-off to detect the abnormally high deceleration rate of a binding wheel.

The main landing gear of aircraft may consist of as few as two wheels having inflated tires, or modern high capacity aircraft may include as many as eight or twelve or sixteen such wheels; and these landing gear structures are capable of withstanding enormous loads and shocks at very high landing and take-off speeds.

For such aircraft there is no practical system known which advises the operators within the aircraft of the wheel or brake condition. In an aircraft having a large number of main gear wheels, one wheel may be fully locked and this would not necessarily be noticeable to the operators, on the take-off or landing roll for example, until a resulting more serious situation is created. If one wheel is locked or nearly locked, for example, the tire will likely blowout fairly soon; and this creates a higher load on the adjacent tires encouraging further tire failures in the manner of a chain reaction. It is most desirable that the aircraft operators be advised of a locked wheel or a particular locked wheel as soon as possible, so that appropriate corrective action may be taken.

If one wheel is locked or nearly fully locked at the time of landing of the aircraft, unknown to the operators, severe damage to that wheel and its associated support structure will certainly be sustained. More seriously the loss of that one wheel may cause loss of control of the aircraft on landing or may induce a chain reaction of further wheel losses which are extremely hazardous to the safety of the aircraft and its cargo or passenger load. For an aircraft having a smaller number of landing gear wheels, the loss of one wheel is much more hazardous than that for an aircraft with a larger number of wheels.

One form of system which has been employed for detecting brake failure, is a thermocouple system for detecting heat buildup in wheels and potential brake failure due to overheating. Such a system has been found defective because it does not indicate the problem until the brake lockup is imminent. The system is unreliable because it depends on relatively fragile wire conductors which are susceptible to damage during normal wheel maintenance operations, and which wires are frequently disconnected during normal wheel maintenance changes, etc. resulting in possible inadvertent failure to reconnect.

A principal object of this invention is to improve the safety of aircraft operation.

Another principal object of this invention is to provide an effective and reliable system to enable detection, by the aircraft operating personnel, of a locked wheel before the aircraft leaves the ground, or of a binding wheel immediately after lift-off, so that appropriate action may be taken to prevent or minimize damage or accident.

Another object of this invention is to provide such a system which will detect a binding wheel independently of any of the other wheels of the aircraft and without necessity for comparison with another wheel.

A further object of this invention is to provide such a system which enables detection of a locked wheel during the taxi-out of the aircraft, and in which the operation of the system during taxi-out functions simultaneously as a check on the operativeness of the system particularly with respect to the indicator lights.

Still another object of this invention is to provide such a system which enables detection of a binding wheel by detecting abnormal deceleration of the wheel immediately after lift-off, whereby the aircraft operator is forewarned of this condition enabling precautionary measures on the subsequent landing of the aircraft.

A still further object of this invention is to provide such a system for use complementary to a brake anti-skid system, with the two systems utilizing the output from the same wheel speed transducer.

Another object of this invention is to provide such a system which monitors wheel condition continuously during frequent taxi stops and starts in heavy traffic.

Certain of these objects are accomplished in a system which includes a signal generating means, including a wheel speed transducer means coupled to one wheel, for producing a DC voltage wheel speed signal which is proportional to the rotational speed of that wheel. An electrically operated indicator indicates one of two conditions.

A comparator circuit compares DC voltage wheel input and reference input signals, and produces an output signal when the wheel input signal goes negative relative to the reference input signal. A first charging circuit couples the output of the signal generating means to one comparator circuit input for producing said wheel input signal which tracks the increasing and decreasing wheel speed signal. A second charging circuit couples the output of the signal generating means to another comparator circuit input for producing said reference input signal which tracks the increasing wheel speed signal at a selected lower value whereby the reference input signal is maintained negative relative to said wheel input signal during the tracking of an increasing wheel speed signal, and which reference input signal tracks the decreasing wheel speed signal with a time delay greater than that of said wheel input signal whereby said wheel input signal will go negative relative to said reference input signal for an abnormally high deceleration rate of said wheel. The comparator circuit output is coupled to the indicator.

For accomplishing other objects, a second comparator compares two DC voltage input signals and produces an output signal for energizing said indicator when one input is positive relative to the other. The comparator circuit includes means producing a fixed, threshold voltage signal. A charging circuit couples the output of the signal generating means to the other input of the second comparator for producing a DC voltage on-ground input signal which tracks the increasing and decreasing wheel speed signal, and effects shutoff of the comparator output when the on-ground input signal goes positive relative to the threshold signal, thereby de-energizing the indicator means.

The novel features and the advantages of the invention, as well as additional objects thereof, will be understood more fully from the following description when read in connection with the accompanying drawing.

DRAWING

FIGS. 1 and 1A are schematic and diagrammatic circuit drawings of a system circuit for one of the main landing gear wheels of an aircraft.

DESCRIPTION OF THE PREFERRED EMBODIMENT

Figure 1:
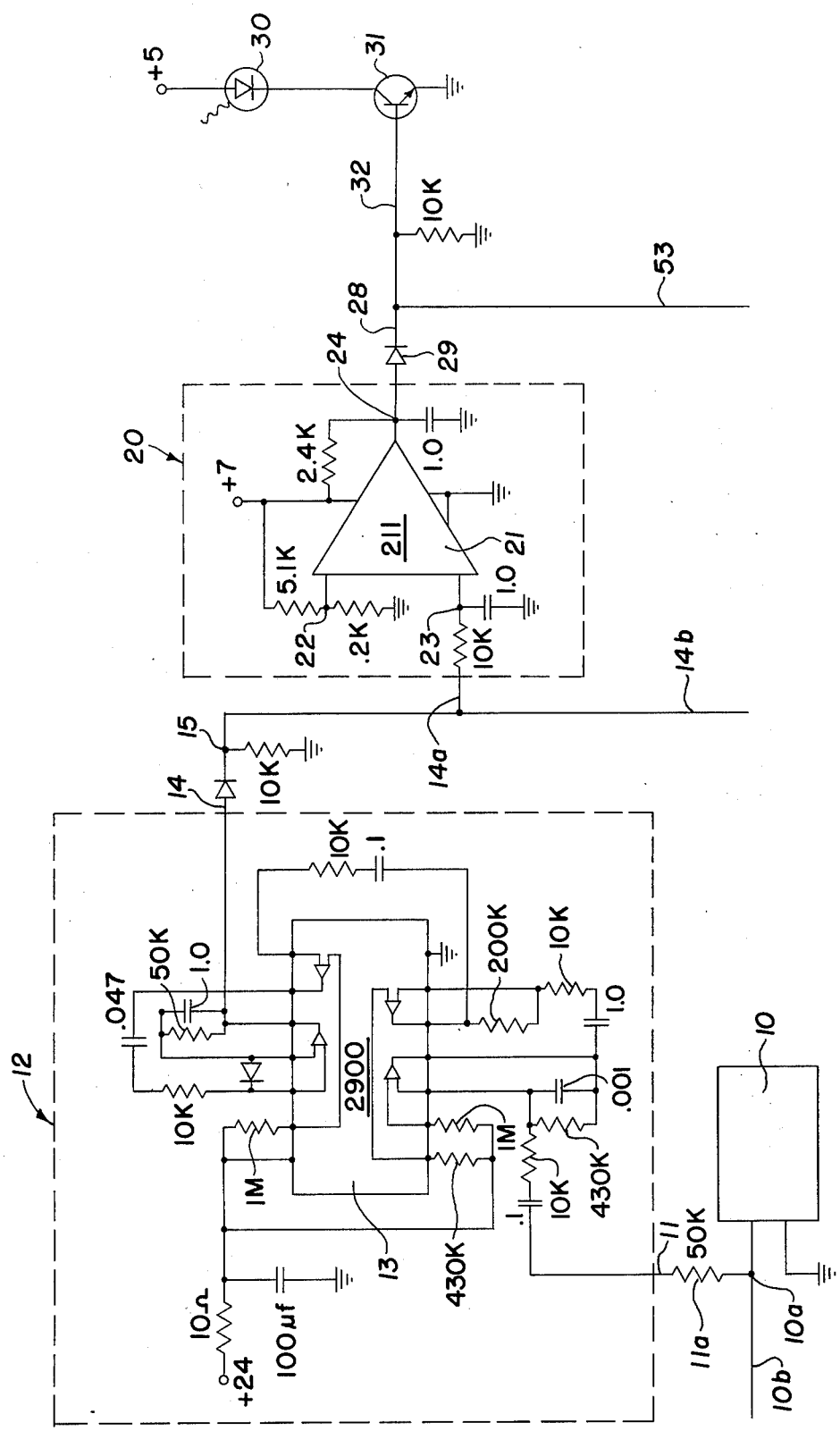
Figure 1A:
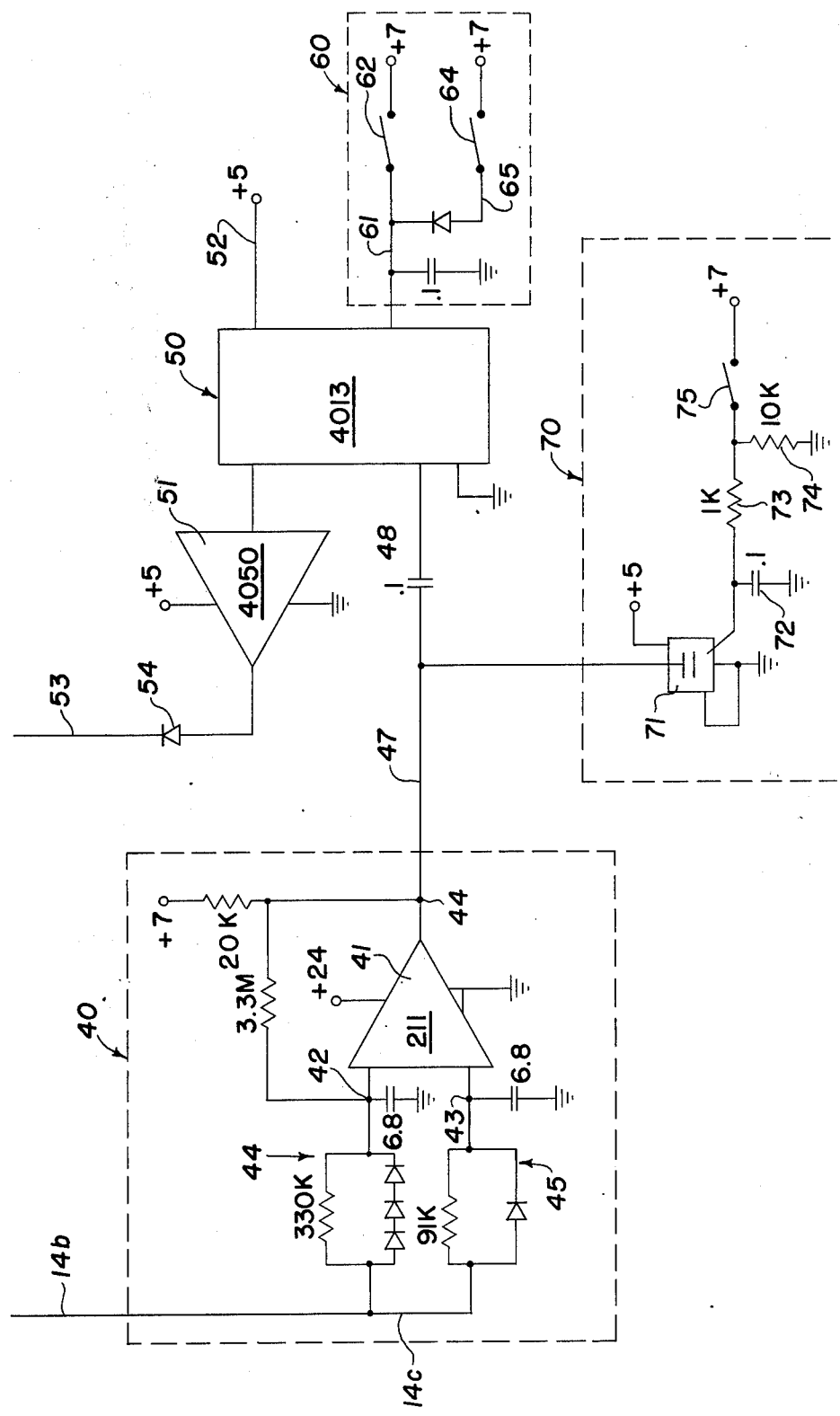

The described circuit is for one wheel of the main landing gear of an aircraft. Identical independent circuits would, of course, be provided for each wheel of the main landing gear. The described circuit is designed for the use of integrated circuit components; and it will be understood that some of the described components will have the capacity to function in two or more of the independent wheel circuits. With the use of integrated circuits, reliable and economic circuits can be designed for aircraft regardless of the number of wheels of the main landing gear. The circuits for each wheel would function independently of each other, with no comparison of the performance of one wheel against another.

Referring to the operation of the system in general, the system includes a visual indicator in the form of an LED (light emitting diode) to indicate the described conditions for each wheel. A bank of these LEDs are located in the control cabin to advise the operators of the conditions of the several main gear wheels. For one advisory aspect of the system, the LED will light up when the system is turned on with the aircraft standing. This indicates that the system is operative. A comparator compares wheel speed output signal in relation to a fixed threshold signal to cause the LED to go out when the aircraft accelerates to a selected taxi speed such as 15 knots. If an LED does not go out when this ground speed is reached, this indicates that the wheel has not achieved the rpm corresponding to that ground speed and is either locked up or dragging. The aircraft may then be parked immediately or return to station for corrective action. For a second advisory aspect, the system detects the deceleration rate of the wheel immediately after lift-off. If the deceleration rate is too high indicating a binding wheel, the LED lights to advise the aircraft operators of that condition so that appropriate precautions may be taken at the next landing of the aircraft.

Referring now to the drawing, the basic input device is a wheel speed transducer 10 for producing an AC voltage signal, which is proportional to the wheel rpm. An example of such transducer is the Hytrol Wheel Speed Transducer, Part No. 40-581, manufactured by Hydro-Aire Division of Crane Company, Burbank, California. This transducer includes an electrically energized magnetic circuit which generates a sinuous voltage at the rate of 50 cycles per wheel revolution and is the type of component frequently employed with anti-skid braking systems found on many commercial and military aircraft. The output from this transducer is approximately 200 to 400 mv.

The transducer 10 is connected by means of conductor 11 to a very high gain amplifier circuit. Preferably, this connecting circuit 11 includes a 50000 ohm isolating resistor 11a between the amplifier circuit 12 and a junction point 10a, to which an anti-skid braking system may be connected through conductor 10b. The resistor 11a isolates the remainder of the circuit from the transducer 10, particularly to prevent any interference with an anti-skid braking system which may be coupled also to this transducer.

The amplifier circuit 12 represents a very high gain amplifier to assure that the wheels and brake advisory system will function from the residual magnetism of the transducer only, in the event that the transducer is not energized for whatever reason. The amplifier circuit circuit includes LM 2900 Quad Amplifier 13 which includes four stages of amplification as indicated in the drawing. This amplifier circuit functions to convert the sinuous input signal to a square wave, and includes an integrating circuit to produce a DC output voltage signal which is proportional to the wheel rpm. The output voltage is coupled to the remainder of the circuit through conductor 14 and diode 16, and will be referred to as the wheel speed signal which appears at output point 15.

The amplifier circuit 12 is designed, for example, to produce a DC output voltage at the output point 15 ranging from 0 to 18 volts, which output voltage is directly proportional to wheel rpm ranging from 0 to 1800 rpm, and which voltage and rpm are in turn directly proportional to ground speed ranging from 0 to 135 knots for example. With this relationship, when the aircraft ground speed reaches about 15 knots, the wheel speed signal appearing at output point 15 will be approximately 2 volts.

On Ground Advisory System

One aspect of the advisory system is to advise the aircraft operators of a locked wheel during the taxiing operations of the aircraft, or at all times while the aircraft is on the ground. For this purpose, a comparator circuit 20 controls the operation of the LED 30 as will now be described.

The comparator circuit 20 includes an LM 211 Voltage Comparator 21 having associated input points 22 and 23 and output point 24. The input point 22 is maintained at a voltage level of plus 2 volts, referred to as a threshold voltage or signal, by means of the associated 7 volt power supply and the 5.1K and 2K resistors. An output voltage of plus 5 volts appears at the output point 24, unless this output point is grounded through the comparator 21. The comparator circuit functions in a manner that an output signal appears at point 24 when the threshold voltage at input point 22 is more positive than the input voltage at point 23; and the output point 24 is grounded to reduce the output voltage to 0 when the input voltage at point 23 goes positive relative to the threshold voltage at point 22.

The wheel speed signal appearing at point 15 is coupled to comparator input 23 through conductor 14a and a charging circuit including a 10K resistor and a 1.0mf capacitor; and the voltage at point 23 referred to as the "on-ground input signal" will track closely the wheel speed signal. It will be seen that when the system is turned on with the aircraft at a standstill, the on-ground input signal is zero and negative relative to the threshold signal at 22. Accordingly, an output signal appears at point 24 and is applied to drive the transistor 31 through conductors 28 and 32 and diode 29. With the transistors 31 conducting, the LED 30 is energized through its power supply. The aircraft operator observing the bank of lighted LEDs for the respective main gear wheels is informed that the system is operational.

When the speed of the taxiing aircraft increases through 15 knot threshold speed, the on-ground input signal 23 goes positive relative to the threshold signal 22 causing the output signal 24 to go to zero to effect shut-off of the LED 30. The aircraft operator, again observing the bank of LEDs, will note as the taxi speed passes the 15 knot threshold speed, that all of the LEDs go out indicating no wheel problems. Should one or more LEDs remain lit at this point, the operator will be informed that the respective one or more wheels has not achieved the desired rpm and is either locked up, or possibly there is a failure of the mechanical coupling between the wheel transducer and wheel. The aircraft may then be parked immediately or returned to station for evaluation and correction of the problem. When the taxi speed decreases through the threshold speed, the LEDs again light up.

This system is operational of course for all taxi and rolling conditions. During taxi out under heavy traffic conditions, where the aircraft is intermittently and frequently braked, there is a probability of overheated brakes; and this system provides a continuous monitor during taxi conditions for a locked wheel during such conditions.

Wheel Deceleration Advisory System

An important aspect of the system is to monitor the wheel deceleration rate of the aircraft wheel immediately after lift-off, and advise of an excessively high deceleration rate indicative of a binding wheel. This circuit includes a second comparator circuit 40 which compares two input voltages derived from the wheel input signal 15, a latching circuit 50 responsive to the output of the comparator circuit 40 and including a buffer amplifier 51 which drives the transistor 31 for the LED 30, reset circuitry 60 for the latching circuit 50, and a gear up deactivating circuit 70 for rendering this deceleration advisory system inactive after gear up command.

The comparator circuit 40 includes a comparator 41 in the form of an LM 211 Voltage Comparator having respective input points 42 and 43 and output point 46. The input point 42 is connected to the amplifier circuit output through conductor 14b and charging circuit 44 including a 330K resistor, three series connected diodes, and a 6.8 mf capacitor. Through this charging circuit 44 the voltage at input point 42 referred to as the "reference input signal" tracks the increasing wheel speed signal voltage relatively closely but at a uniformly lower value (about 1 volt lower) because of the voltage drop through the three series connected diodes. The input point 43 is connected to the amplifier output through the conductors 14b and 14c and charging circuit 45 made up of a 91K resistor, a diode connected in parallel with the resistor, and a 6.8 mf capacitor. Through this charging circuit 45, the voltage at input point 43, referred to as the "wheel input signal", tracks the increasing wheel speed signal relatively closely with substantially no voltage drop. Accordingly under normal conditions of increasing wheel speed signal voltage, the wheel input signal 43 is maintained positive relative to the reference input signal 42. For this normal condition, the comparator 41 grounds the output point 46 so that no voltage or output signal appears.

This normal condition also maintains when the wheel speed signal 15 and the corresponding wheel input signal 43 and reference input signal 42 are decreasing (corresponding to deceleration of the wheel) provided that the wheel deceleration rate is normal. It should be noted, however, that the charging circuit 44 has a time delay about three times longer than the time delay for the charging circuit 45; therefore, for a rapidly decreasing wheel speed signal the reference input signal 42 will decrease at a slower rate than the wheel input signal 43, the charging circuits necessarily discharging through the respective resistors. This means that if the wheel speed signal 15 and the closely tracking wheel input signal 43 decrease at an abnormally fast rate, the wheel input signal will go negative relative to the reference input signal 42; and for this condition the comparator 41 causes an output voltage signal to appear at output point 46.

This comparator output signal is converted to a pulse by the 0.1 mf capacitor 48 in the conductor 47 which couples the comparator circuit to the latching circuit 50. This pulse causes the latching circuit to latch, thereby energizing buffer amplifier 51 through its associated power supply source 52; and the buffer amplifier in turn drives the LED transistor 31 through the conductors 53 and 32 and diode 54. It will now be seen that the diode 54 isolates the deceleration advisory system from the on-ground advisory system; and, by the same token, the diode 29 isolates the on-ground advisory system from the deceleration advisory system. It will be seen then that the comparator circuit 40 detects a wheel which decelerates at an abnormally high rate, and directs a signal to the latching circuit 50 which in turn effects lighting of the LED 30. This LED will remain lit, to indicate the defective wheel, until the latching circuit is unlatched as will be described.

This wheel deceleration advisory system is designed to function for only an approximate ten second period between nosewheel lift-off and the "gear-up command", is designed so that a deceleration rate of the wheel which is sufficiently high to represent a potential problem will be detected during this 10 second period, and is designed so that extraneous signals of the aircraft cannot cause a false signal (i.e. lighted LED) to occur. One aspect of this control is the latching circuit which, in the illustrated circuit is a CD 4013 Dual 'D' -Type Flip-Flop With Set-Reset Capability. The buffer amplifier 51 which is energized through this flip-flop 50 is, in the illustrated circuit, a CD 4050 Non-Inverting Type Hex Buffer. This buffer amplifier 51 provides the necessary amperage for driving the transistor 31; and isolates the transistor driving circuit from the triggering circuit which includes the 4013 flip-flop 50.

This flip-flop 50 is latched and unlatched by voltage pulses; and, in normal operation as described, is latched by an output pulse from the comparator circuit 40 through capacitor 48. When the flip-flop has been latched in this manner to light the LED 30, the operator may unlatch the flip-flop by means of reset circuitry 60 which includes a manual reset switch 62 connected in conductor 61 connecting the flip-flop to a suitable 7 volt power supply. A parallel reset circuit includes a nosewheel switch 64 coupling the flip-flop to another 7 volt power supply through conductors 65 and 61 and an associated diode in conductor 65. The nosewheel switch 64 is associated with the nosewheel strut, and arranged to be maintained closed while the aircraft is on ground to provide a continuous, automatic reset voltage signal to the flip-flop 50. This effectively prevents the latching of the flip-flop in the sense that, should the flip-flop be latched by an extraneous pulse signal the coexisting continuous reset signal will immediately unlatch. The net result may possibly be a flickering of the LED 30, which the operator recognizes as no signal while the aircraft is on the ground and rolling at a ground speed in excess of 15 knots. As soon as the nosewheel strut extends at the moment of nosewheel lift-off, the switch 64 opens to negate the reset signal; and this represents the beginning of the 10 second monitoring period for this wheel deceleration advisory system. At the moment of nosewheel lift-off, the main gear wheels are at maximum rpm as the main gear wheels then lift-off. The aircraft operating procedure will require that the pilot wait at least 10 seconds before activating the gear up control which represents the end of this monitoring cycle. For many aircraft, the gear up control will effect braking of the wheels to prevent damage to the wheel wells, and this represents abnormal deceleration which would trigger the system if operative. To eliminate the possibility of any false signals, the comparator output point 46 is grounded by the circuit 70 simultaneously with the gear up control command.

The negating circuit 70 includes a very fast acting solid state switch 71 which closes to ground the comparator circuit output point 46 when the switch receives a control signal. In the illustrated circuit this relay is a CD 4016 Quad Bilateral Switch. This switch is activated through a control circuit including capacitor 72, resistors 73 and 74 and switch 75 which connects the control circuit to a 7 volt power supply. The switch 75 is closed simultaneously with (and is a function of) the gear up command control. With the gear up command, then, the switch 75 is closed to effect the closing of switch 71 thereby grounding the comparator circuit output point 46 preventing any signal passing from the comparator circuit to the latching circuit 50. The capacitor 72 and resistor 73 function as an RC filter to prevent any possible "trash signal", from the aircraft circuitry, from effecting closing the switch 71 during the 10 second monitoring time of this system. The switch 71 would normally remain closed until reset for a subsequent aircraft take-off.

Operation

When the aircraft is started up and the wheels and brake advisory system turned on, since the wheel speed signal is zero the comparator circuit 20 for each wheel will effect the lighting of its respective LED. The aircraft operator, observing that all LEDs of the bank are lighted, will be informed that the system is operational. When the aircraft is being taxied, normally of the LEDs will go out as the aircraft passes through the threshold speed of 15 knots; and by the same token, when the taxi speed decreases through the threshold speed the LEDs will again light up. Accordingly, during taxiing where the aircraft is alternately accelerated and braked through the threshold speed, the monitoring of the bank of LEDs will assure the operators that the system remains operational and that the main gear wheels are rolling normally. This is particularly useful during taxi out to take-off in heavy traffic where the aircraft is alternately accelerated and braked. Under these conditions one or more brakes could overheat and approach a lockup condition. Any severe wheel dragging or lockup will be indicated by the LEDs which fail to go out when the aircraft accelerates through 15 knots. The condition of the wheel brakes can be monitored then even up to beginning of the take-off roll. Should a locked wheel be indicated at the beginning of the take-off roll, the take-off may be rejected.

Referring now to the operation of the wheel deceleration advisory system, this system is inoperative while the aircraft is on ground through automatic reset switch 64 of the reset circuit 60 which is controlled by the nosewheel strut. As soon as the operator raises the nose of the aircraft to assume take-off attitude, the switch 64 opens to remove the automatic reset voltage; and the latching circuit flip-flop 50 is conditioned to accept a signal from the comparator circuit 40 to effect the lighting of the respective LED 30. When the switch 64 opens, this starts the monitoring period for this wheel deceleration advisory system. As soon as the main gear wheels lift off, if all wheels decelerate at a normal rate, the respective wheel input signals 43 will remain positive relative to the respective reference input signals 42, and the respective LEDs will remain unlighted. Should one wheel decelerate at an abnormally high rate, the wheel input signal 43 will decrease at a faster rate thereby going negative relative to the reference input signal to produce an output signal 46 which effects latching of the latching circuit 50, causing the respective LED 30 to light and indicate this condition. The time constants of the charging circuits 44 and 45 are chosen so that this cross-over of the wheel input signal and reference input signal will occur during the 10 second monitoring cycle for all abnormal deceleration rates of the wheel for the particular aircraft involved. The LED is held in lighted condition by the latching circuit 50 to enable ample time for the operator to note the condition; and the LED is then turned off through the manual reset switch 62.

The end of the 10 second monitoring period for this circuit is determined by the gear up command. When the operator actuates the gear up control, the switch 71 is closed to ground the comparator circuit output point 46 and prevent any further signal from being transmitted to the latching circuit 50. It is important, both during and immediately following the 10 second monitoring period, that no false signal be allowed to trigger a respective latching circuit to produce a false LED indication. Through circuitry not described, it is preferable that this negating circuit remain operative to ground the output point 46 at all times until the aircraft is again readied for a subsequent take-off.

Features and Advantages

What has been described is a wheels and brakes advisory system which functions to advise the aircraft operators of the existence of a locked wheel while the aircraft is being taxied to the take-off position, and to advise the operators of a potentially locked (binding) wheel through monitoring of wheel deceleration rate immediately after lift-off.

A particular feature and advantage of the on-ground system is that it automatically indicates that the system is operational, in that the bank of signal lights are immediately lighted when the system is turned on indicating that all of the system lights are operational; and, during alternate acceleration and braking in taxiing situations, the signal lights are intermittently going on and off to further indicate that the system is operational in addition to providing the specific indicating function described.

A feature of the overall system is that its design includes an electro-magnetic signal generator and a high gain amplifier, which enables this system to function from the residual magnetism of the signal generator in the event that the electro-magnetic generator may not be energized for whatever reason.

Another feature of the system is the provision of an amplifier which provides a very good linear relationship between the wheel speed and the DC output voltage, which is important to the accurate functioning of both the on-ground advisory system and the wheel deceleration advisory system.

A feature and advantage of the on-ground advisory system is that it provides for very close monitoring of brakes which might well overheat during heavy traffic conditions where the aircraft is intermittently accelerated and braked, and allows corrective action to be taken prior to take-off.

A particular feature of the system is that it is designed with integrated circuits and circuit features providing high reliability, low cost, low weight, low power requirements, and therefore is a very worthwhile and practical adjunct to safe aircraft operation.

A further important feature and advantage of the system, resulting from the use of a high gain amplifier and an isolating resistor, is that the system will not interfere with an anti-skid system which utilizes the same wheel speed transducer.

While the preferred embodiment of the invention has been illustrated and described, it will be understood by those skilled in the art that changes and modifications may be resorted to without departing from the spirit and scope of the invention.

What is claimed is:

1. An advisory system for detecting and indicating a binding wheel of an aircraft comprising
    signal generating means, including wheel speed transducer means coupled to one wheel for producing a DC voltage wheel speed signal which is proportional in linear relation to the rotational speed of said one wheel;
    an electrically operated indicator means;
    a comparator circuit having two inputs, for comparing two DC voltage input signals, and having an output;
    a first charging circuit coupling the output of said signal generating means to one comparator circuit input, for producing a wheel input signal which tracks the increasing and decreasing wheel speed signal;
    a second charging circuit coupling the output of said signal generating means to another comparator circuit input for producing a reference input signal, which reference input signal tracks the increasing wheel speed signal at a selected lower value whereby said reference input signal is maintained negative relative to said wheel input signal during the tracking of an increasing wheel speed signal, and which reference input signal tracks the decreasing wheel speed signal with a time delay greater than that of said wheel input signal whereby said wheel input signal will go negative relative to said reference input signal for an abnormally high deceleration rate of said wheel;
    said comparator circuit producing an output signal when said wheel input signal goes negative relative to said reference input signal;
    and circuit means coupling the output of said comparator circuit to said indicator means.

2. An advisory system as set forth in claim 1, said coupling circuit means comprising
    a power supply for said indicator means; a latching circuit for selectively coupling said power supply to said indicator means;
    means coupling the output of said comparator circuit to said latching circuit whereby the comparator output signal latches said latching circuit to effect energization of said indicator means;
    and a reset circuit coupled to said latching circuit for unlatching said latching circuit to effect de-energization of said indicator means.

3. An advisory system as set forth in claim 1 said coupling circuit means including means for converting a DC voltage output signal from said comparator circuit to a single pulse signal.

4. An advisory system as set forth in claim 2 said reset circuit comprising an automatic reset circuit including switch means controlled by the nosewheel of the aircraft for producing a continuous reset signal for unlatching said latching circuit; said nosewheel switch means being responsive to the on-ground condition of said nosewheel to energize said automatic reset circuit, and being responsive to the lift-off condition of the aircraft nosewheel to de-energize said automatic reset circuit; said automatic reset circuit thereby enabling latching of said latching circuit following nosewheel lift-off of the aircraft.

5. An advisory system as set forth in claim 4 said latching circuit comprising an integrated circuit data-type flip-flop; said automatic reset circuit, when energized, providing a continuous reset voltage signal to the reset input of said flip-flop.

6. An advisory system as set forth in claim 5 said coupling circuit further comprising means for converting the output signal of said comparator circuit to a single pulse signal.

7. An advisory system as set forth in claim 1 a negating circuit coupled to the output of said comparator circuit for grounding said comparator circuit output; said negating circuit including switch means responsive to the gear up command control of said aircraft for closing said negating circuit to ground said comparator output, whereby no output signal can pass to said indicator means.

8. An advisory system as set forth in claim 4 a negating circuit coupled to the output of said comparator circuit for grounding said comparator circuit output; said negating circuit including switch means responsive to the gear up command control of said aircraft for closing said negating circuit to ground said comparator output, whereby no output signal can pass to said latching circuit.

9. An advisory system as set forth in claim 1 a second comparator circuit having two inputs, for comparing two DC voltage input signals, and having an output;
    said second comparator circuit including means for producing a threshold input signal at one input thereof, at a fixed voltage proportional to a selected threshold ground speed and related threshold wheel rpm of said aircraft;
    a third charging circuit coupling the output of said signal generating means to another input of said second comparator circuit for producing a ground speed input signal which tracks the increasing and decreasing wheel speed signal;
    circuit means coupling the output of said second comparator circuit to said indicator means;
    said second comparator circuit producing an output signal for energizing said indicator means when said ground speed signal is negative relative to said threshold signal; whereby said second comparator circuit effects the de-energization of said indicator means when the aircraft wheel rpm exceeds the threshold rpm, and effects the energization of said indicator means when the wheel rpm decreases below the threshold rpm.

10. In an advisory system for detecting and indicating an abnormal rate of change, in one direction, of a changing function comprising signal generating means, including transducer means responsive to a changing wheel speed function, for producing a changing DC voltage function signal which is proportional in linear relation to the change of said wheel speed function;

a comparator circuit, having two inputs and an output, for comparing two DC voltage input signals and for producing an output signal when one input signal changes polarity relative to the other input signal;

a first charging circuit, coupling the output of said signal generating means to one comparator circuit input, for producing a function input signal which tracks the changing function signal;

a second charging circuit, coupling the output of said signal generating means to the other comparator circuit input, for producing a reference input signal which tracks the changing function signal at a selected difference value relative to said function input signal and which tracks the changing function signal with a time delay greater than that of said function input signal, whereby said function input signal will change polarity relative to said reference input signal for a selected abnormally high rate of change of said function signal;

said first charging circuit comprising parallel branch circuits, including a resistance branch and a diode branch, connecting input and output points, and a capacitor coupling said output point to ground; said resistance branch including resistance means of selected value; said diode branch including diode means of selected resistance value to pass current from said input point to said output point;

said second charging circuit comprising parallel branch circuits, including a resistance branch and a diode branch, connecting input and output points, and a capacitor coupling the output points to ground; said resistance branch including resistance means of higher value than the resistance means of said first charging circuit resistance branch; said diode branch including diode means of selected resistance value to pass current from the input to the output point, said resistance value of said second charging circuit diode means being higher than the resistance value of said first charging circuit diode means;

said second charging circuit, for an increasing function signal, thereby producing a reference input signal which is lower in value than the function input signal produced by said first charging circuit;

and said second charging circuit, for a rapidly decreasing function signal, producing a reference input signal which decreases slower than the function input signal produced by said first charging circuit, thereby allowing said function input signal to change polarity relative to said reference input signal;

said signal generating means including wheel speed transducer means, whereby the produced voltage function signal is proportional to the rotational speed of the wheel; said function input signal and said reference input signal thereby decreasing when said wheel speed decreases; and said system producing a comparator output signal when said wheel speed decreases at a selected abnormally higher rate due to a binding brake.

* * * * *